United States Patent
Kashiwakura et al.

(10) Patent No.: US 12,498,229 B2
(45) Date of Patent: Dec. 16, 2025

(54) INFORMATION PROCESSING APPARATUS, METHOD, AND NON-TRANSITORY COMPUTER READABLE MEDIUM

(71) Applicant: TOYOTA JIDOSHA KABUSHIKI KAISHA, Toyota (JP)

(72) Inventors: Toshiki Kashiwakura, Ota-ku (JP); Ai Miyata, Sakai (JP); Kotaro Hirose, Nisshin (JP); Sho Minagawa, Nisshin (JP); Yuki Uchida, Iwakura (JP); Tsuyoshi Okada, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 209 days.

(21) Appl. No.: 18/459,720

(22) Filed: Sep. 1, 2023

(65) Prior Publication Data

US 2024/0085195 A1   Mar. 14, 2024

(30) Foreign Application Priority Data

Sep. 13, 2022  (JP) .................................. 2022-145648

(51) Int. Cl.
*G01C 21/34* (2006.01)
*G01C 21/36* (2006.01)

(52) U.S. Cl.
CPC ....... *G01C 21/343* (2013.01); *G01C 21/3484* (2013.01); *G01C 21/3617* (2013.01); *G01C 21/3629* (2013.01)

(58) Field of Classification Search
None
See application file for complete search history.

(56) References Cited

U.S. PATENT DOCUMENTS 5,940,803 A * 8/1999 Kanemitsu ............. G06Q 10/02
                                                        705/5
11,460,309 B2 * 10/2022 Aizawa .................. G06F 18/24

FOREIGN PATENT DOCUMENTS

| JP | 2002-279031 A | 9/2002 |
| JP | 2003-006281 A | 1/2003 |
| JP | 2012159413 A * | 8/2012 |
| JP | 2017-211932 A | 11/2017 |

OTHER PUBLICATIONS

Han, Yan, et al., "Tour Route Multiobjective Optimization Design Based on the Tourist Satisfaction", Jan. 8, 2014, Hindawi Publishing corporation (Year: 2014).*
Machine translation of Nishiyama (JP-2012159413-A) (Year: 2012).*
Isoda, Shoga, et al., "Timeliness-Aware On-Site Planning Method for Tour Navigation", Sep. 24, 2020 (Year: 2020).*

* cited by examiner

*Primary Examiner* — Hitesh Patel
*Assistant Examiner* — Sarah A. Mueller
(74) *Attorney, Agent, or Firm* — Oliff PLC

(57) ABSTRACT

An information processing apparatus configured to determine a tour schedule around a facility, the information processing apparatus includes a controller configured to determine a tour time at a tour spot in the tour schedule, based on biological information on a user who is observing a process performed by equipment at the tour spot in the facility.

12 Claims, 5 Drawing Sheets

INFORMATION PROCESSING APPARATUS, METHOD, AND NON-TRANSITORY COMPUTER READABLE MEDIUM

CROSS-REFERENCE TO RELATED APPLICATION

This application claims priority to Japanese Patent Application No. 2022-145648 filed on Sep. 13, 2022, the entire contents of which are incorporated herein by reference.

TECHNICAL FIELD

The present disclosure relates to an information processing apparatus, a method, and a non-transitory computer readable medium.

BACKGROUND

Technology regarding apparatuses that determine tour schedules around facilities is known. For example, Patent Literature (PTL) 1 discloses technology regarding an operation system that formulates an operation plan for a sightseeing bus to cover, among sightseeing spots within a predetermined area, sightseeing spots that are selected by persons who wish to board the sightseeing bus.

CITATION LIST

Patent Literature

PTL 1: JP 2002-279031 A

SUMMARY

There is room for improvement with respect to technology regarding apparatuses that determine tour schedules around facilities.

It would be helpful to improve technology regarding apparatuses that determine tour schedules around facilities.

An information processing apparatus according to an embodiment of the present disclosure is an information processing apparatus configured to determine a tour schedule around a facility, the information processing apparatus including a controller configured to determine a tour time at a tour spot in the tour schedule, based on biological information on a user who is observing a process performed by equipment at the tour spot in the facility.

A method according to an embodiment of the present disclosure is a method performed by an information processing apparatus configured to determine a tour schedule around a facility, the method including determining a tour time at a tour spot in the tour schedule, based on biological information on a user who is observing a process performed by equipment at the tour spot in the facility.

A non-transitory computer readable medium according to an embodiment of the present disclosure stores a program configured to cause an information processing apparatus to execute operations, the information processing apparatus being configured to determine a tour schedule around a facility, the operations including determining a tour time at a tour spot in the tour schedule, based on biological information on a user who is observing a process performed by equipment at the tour spot in the facility.

According to an embodiment of the present disclosure, technology regarding apparatuses that determine tour schedules for facilities is improved.

DETAILED DESCRIPTION

Hereinafter, an embodiment of the present disclosure will be described.

Outline of Embodiment

Figure 1:
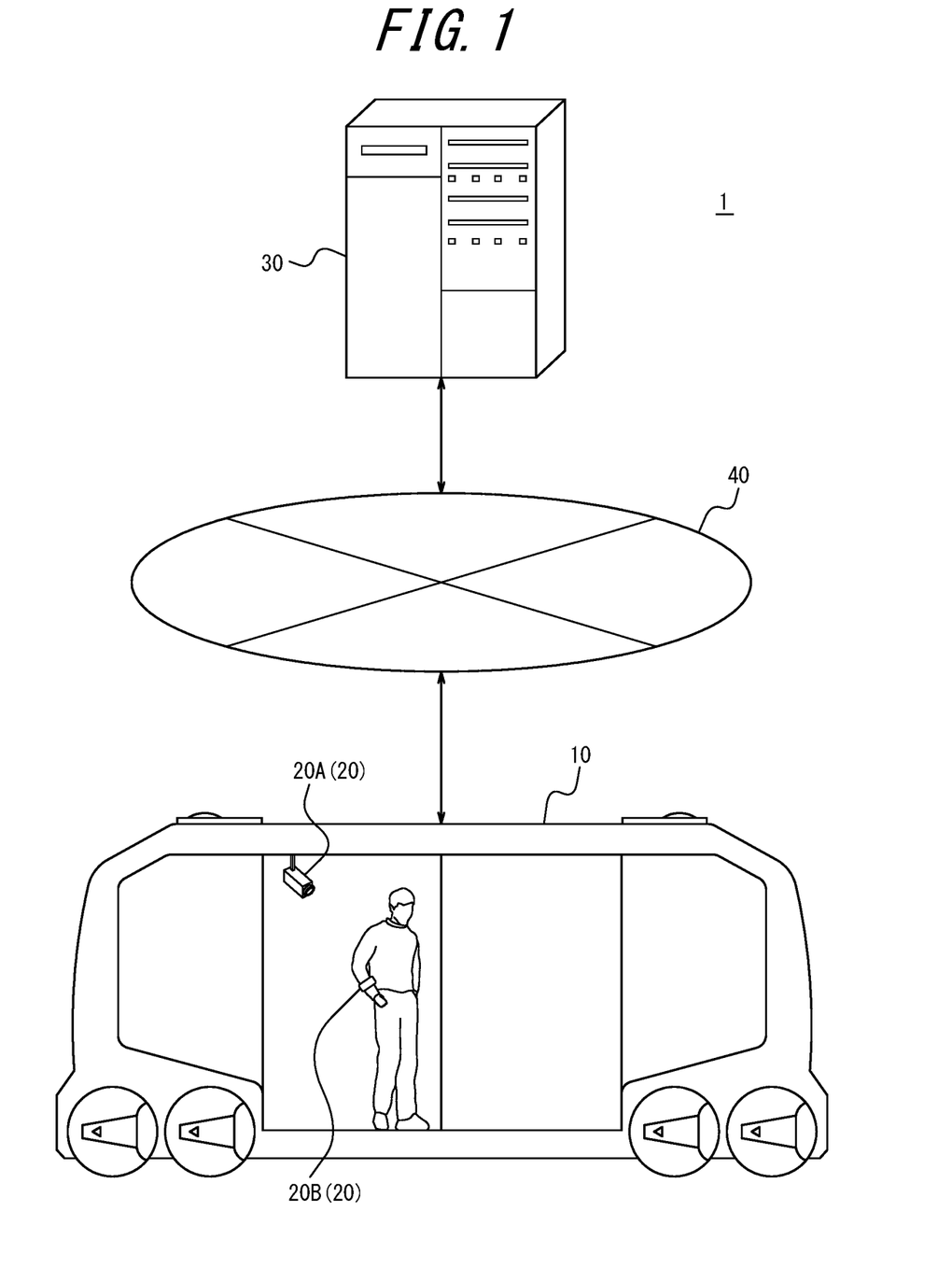
FIG. 1 is a block diagram illustrating a schematic configuration of a system according to an embodiment of the present disclosure.

FIG. 1 is a block diagram illustrating a schematic configuration of a system 1 according to an embodiment of the present disclosure. The system 1 includes a vehicle 10, a biological information detection apparatus 20, and an information processing apparatus 30. The vehicle 10, the biological information detection apparatus 20, and the information processing apparatus are communicably connected to a network 40 including, for example, the Internet, a mobile communication network, and the like.

For simplicity of explanation, FIG. 1 illustrates one each of the vehicle and the information processing apparatus 30 provided in the system 1, but the number of the components is not limited to this. The system 1 may include two or more information processing apparatuses 30. The number of vehicles provided in the system 1 may be two or more, and may be freely determined. In FIG. 1, one camera 20A and one heart rate monitor 20B are illustrated as an example of the biological information detection apparatus 20, but the number of units is not limited to this. As described in more detail later, the biological information detection apparatus 20 is not limited to the camera 20A and the heart rate monitor 20B.

The vehicle 10 is an automobile, for example, but is not limited to this, and may be any appropriate vehicle. The automobile is, for example, a gasoline vehicle, a battery electric vehicle (BEV), a hybrid electric vehicle (HEV), a plug-in hybrid electric vehicle (PHEV), a fuel cell electric vehicle (FCEV), or the like, but is not limited to these. In the present embodiment, the vehicle 10 is assumed to be any autonomous vehicle that travels unmanned, but may also be a manned vehicle.

In the present embodiment, the vehicle 10 travels in a facility, such as a factory, with a user (customer or general user) on board, for example, to allow the user on board to observe equipment provided in the facility from inside the vehicle 10. The equipment is a production line, for example. In such a configuration, the vehicle 10 allows the user on board to observe the process of making products on the production line from inside the vehicle.

The biological information detection apparatus 20 is an apparatus including a detection device that detects biological information. The biological information is information regarding the user's living body that varies in response to the user's emotions and includes, for example, information indicating the user's heart rate, body temperature, sweating rate, brain waves, voice, facial expression, and/or movement.

The information processing apparatus 30 is, for example, a computer such as a server apparatus. The information processing apparatus 30 is, for example, a server that belongs to a cloud computing system or other computing systems. The information processing apparatus 30 is not limited to this, and may be any general purpose electronic device such as a personal computer (PC), or may be any other electronic device that is dedicated to the system 1. The information processing apparatus 30 can communicate with the vehicle 10 via the network 40. In the present embodiment, the information processing apparatus 30 manages a tour schedule around the facility.

First, an outline of the present embodiment will be described, and details thereof will be described later. The information processing apparatus determines a tour time at a tour spot in a tour schedule, based on biological information on a user who is observing a process performed by equipment at the tour spot in the facility. The term "in the facility" is not limited to indoors, but may also include outdoors. The tour spot is a place at which the user observes the process performed by the equipment. The process is also a series of operations performed by one or more pieces of the equipment.

According to the present embodiment, the information processing apparatus 30 can, for example, elongate a tour time at a tour spot with a high evaluation. This increases the user's satisfaction because the user can observe a process performed by equipment at the tour spot with the high evaluation for a longer time. Therefore, technology regarding apparatuses that determine tour schedules around facilities is improved in that the user's satisfaction is increased in a tour around the facility.

Next, configurations of the system 1 will be described in detail.

(Configuration of Vehicle)

Figure 2:
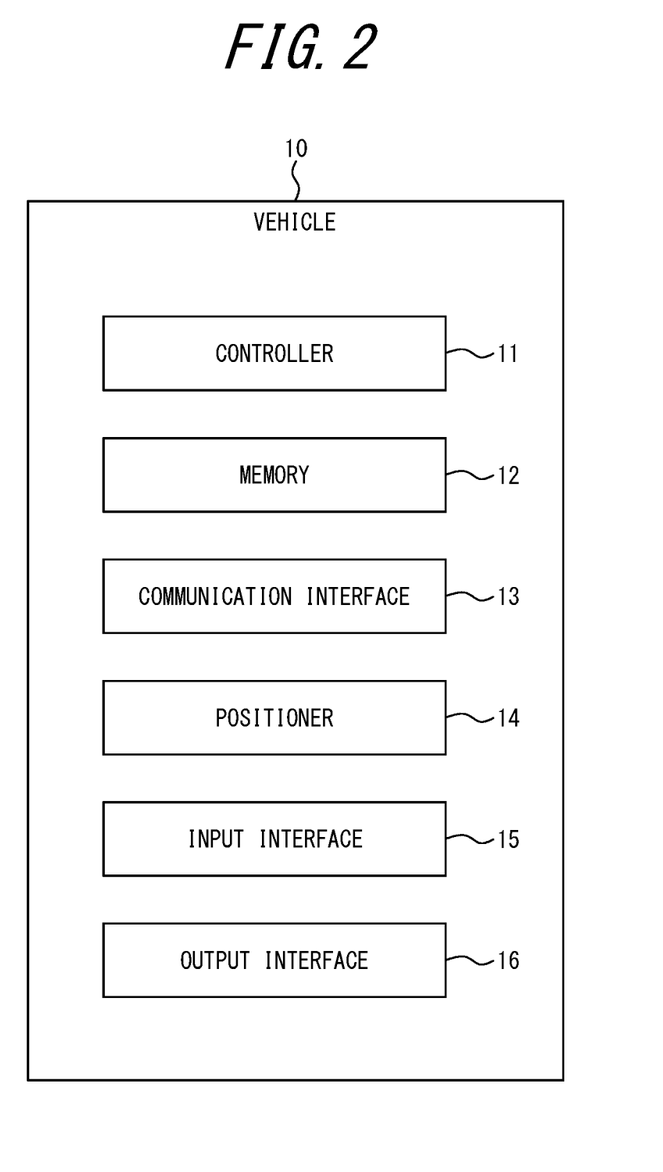
FIG. 2 is a block diagram illustrating a schematic configuration of a vehicle.

As illustrated in FIG. 2, the vehicle 10 includes a controller 11, a memory 12, a communication interface 13, a positioner 14, an input interface 15, and an output interface 16.

The controller 11 includes at least one processor, at least one dedicated circuit, or a combination thereof. The processor is a general purpose processor, such as a central processing unit (CPU) or a graphics processing unit (GPU), or a dedicated processor specialized for particular processing. The dedicated circuit is, for example, a field-programmable gate array (FPGA) or an application specific integrated circuit (ASIC).

The controller 11 includes at least one processor, at least one programmable circuit, at least one dedicated circuit, or a combination of these. The controller 11 controls operations of the entire vehicle 10.

The memory 12 includes one or more memories. The memories are semiconductor memories, magnetic memories, optical memories, or the like, for example, but are not limited to these. The semiconductor memory is, for example, random access memory (RAM) or read only memory (ROM). The RAM is, for example, static random access memory (SRAM) or dynamic random access memory (DRAM). The ROM is, for example, electrically erasable programmable read only memory (EEPROM). The memories included in the memory 12 may each function as, for example, a main memory, an auxiliary memory, or a cache memory. The memory 12 stores any information to be used for the operations of the vehicle 10. For example, the memory 12 may store a system program, an application program, embedded software, and the like. The information stored in the memory 12 may be updated with, for example, information acquired from the network 40 via the communication interface 13. In the present embodiment, the memory 12 can store any information necessary for a tour around the facility by a user.

The communication interface 13 includes at least one interface for external communication for connecting to the network 40. The interface for communication is, for example, an interface compliant with a mobile communication standard such as a Long Term Evolution (LTE), the 4th generation (4G) standard, or the 5th generation (5G) standard, or an interface compliant with a short-range wireless communication standard such as Bluetooth® (Bluetooth is a registered trademark in Japan, other countries, or both), but is not limited to these. The communication interface 13 receives information to be used for the operations of the vehicle 10, and transmits information obtained by the operations of the vehicle 10 to the outside (e.g., information processing apparatus 30). In the present embodiment, the communication interface 13 can transmit and receive any information necessary for the tour around the facility by the user.

The positioner 14 includes one or more apparatuses configured to acquire positional information for the vehicle 10. Specifically, the positioner 14 includes a receiver corresponding to the Global Positioning System (GPS), for example, but is not limited to this, and may include a receiver corresponding to any positioning system. The positioner 14 may acquire the positional information for the vehicle 10 continually, periodically, or non-periodically.

The input interface 15 includes an information input means into the vehicle 10. In the present embodiment, the input interface 15 can accept input of information from the biological information detection apparatus 20.

The output interface 16 includes at least one interface for output. The interface for output is, for example, a display apparatus for outputting information in the form of images, a speaker for outputting information in the form of audio, or the like. The display apparatus is, for example, a liquid crystal display (LCD) or organic electro luminescence (EL) display, but may also be a goggle-type display apparatus that displays virtual reality (VR) images. The output interface 16 outputs information received from the information processing apparatus 30, information obtained by the operations of the vehicle 10, or the like.

(Configuration of Biological Information Detection Apparatus)

Figure 3:
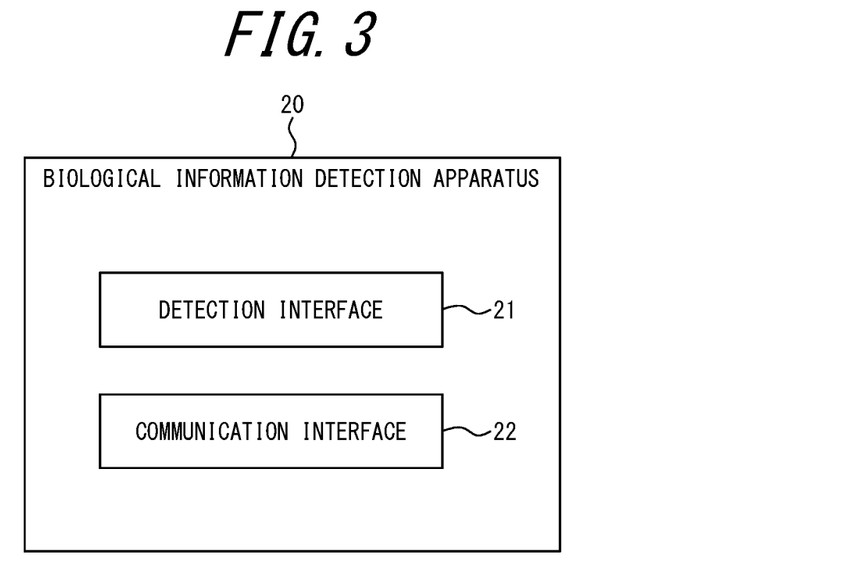
FIG. 3 is a block diagram illustrating a schematic configuration of a biological information detection apparatus.

As illustrated in FIG. 3, the biological information detection apparatus includes a detection interface 21 and a communication interface 22.

The detection interface 21 is a detection device that detects biological information. The detection interface 21 can be, for example, a heart rate monitor to detect a heart rate, a temperature sensor or thermo camera to detect a body temperature, a humidity sensor to detect a sweating rate, an electroencephalograph to detect brain waves, a microphone to detect voice, or a camera to detect a facial expression or movement. In the present embodiment, the detection interface 21 is arranged to be able to detect biological information on a user on board the vehicle 10. For example, the heart rate monitor, temperature sensor, humidity sensor, and electroencephalograph are attached to the user, while the microphone and camera are mounted inside the vehicle 10.

The communication interface 22 includes at least one interface for external communication for connecting to the network 40. The interface for communication is, for example, an interface compliant with a mobile communication standard such as LTE, the 4G standard, or the 5G standard, or an interface compliant with a short-range wireless communication standard such as Bluetooth®, but is not limited to these. The communication interface 22 receives data to be used for operations of the biological information detection apparatus 20, and transmits data obtained by the operations of the biological information detection apparatus 20 to the outside (e.g., information processing apparatus 30).

In the example illustrated in FIG. 3 in the present embodiment, the biological information detection apparatus 20 include neither an input interface nor an output interface, but may further include an input interface and an output interface. In other words, in addition to receiving (input) and transmitting (output) information via the communication interface 22, information may be input and output via the input and output interfaces included in the biological information detection apparatus 20.

(Configuration of Information Processing Apparatus)

Figure 4:
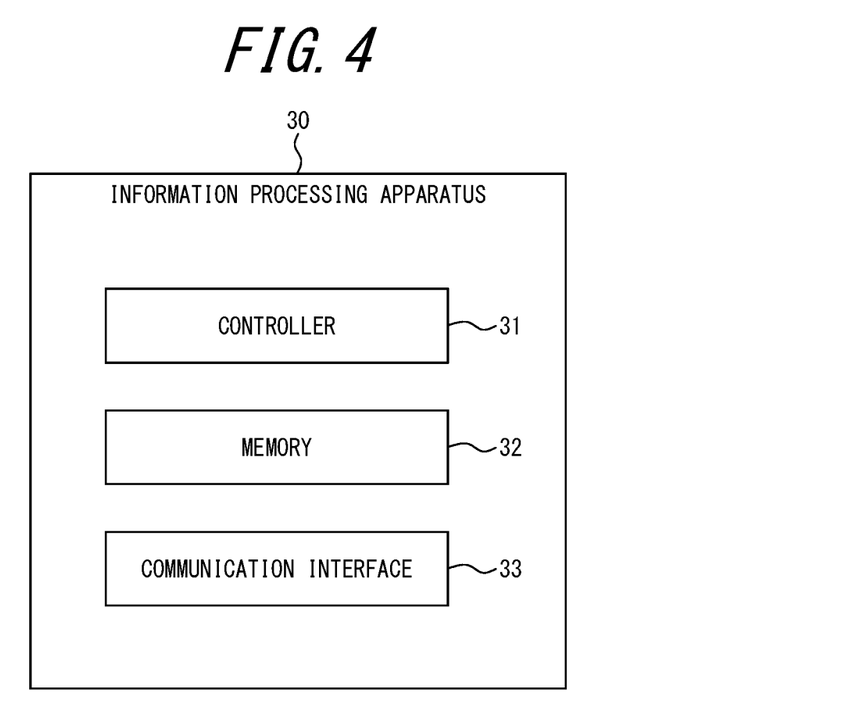
FIG. 4 is a block diagram illustrating a schematic configuration of an information processing apparatus.

As illustrated in FIG. 4, the information processing apparatus 30 includes a controller 31, a memory 32, and a communication interface 33.

The controller 31 includes at least one processor, at least one dedicated circuit, or a combination thereof. The processor is a general purpose processor such as a CPU or a GPU, or a dedicated processor that is dedicated to specific processing. The dedicated circuit is, for example, an FPGA or an ASIC. The controller 31 executes processes related to operations of the information processing apparatus 30 while controlling the components of the information processing apparatus 30.

The controller 31 includes at least one processor, at least one programmable circuit, at least one dedicated circuit, or a combination of these. The controller 31 controls the operations of the entire information processing apparatus 30.

The memory 32 includes one or more memories. The memories are semiconductor memories, magnetic memories, optical memories, or the like, for example, but are not limited to these. The semiconductor memory is, for example, RAM or ROM. The RAM is, for example, SRAM or DRAM. The ROM is, for example, EEPROM. The memories included in the memory 32 each function as, for example, a main memory, an auxiliary memory, or a cache memory. The memory 32 stores any information to be used for the operations of the information processing apparatus 30. For example, the memory 32 may store a system program, an application program, a database, and the like. The information stored in the memory 32 may be updated with, for example, information acquired from the network 40 via the communication interface 33. In the present embodiment, the memory 32 can store any information necessary to determine a tour schedule.

The communication interface 33 includes at least one interface for external communication for connecting to the network 40. The interface for communication may be either a wired or wireless communication interface. For wired communication, the interface for communication is, for example, a Local Area Network (LAN) interface or Universal Serial Bus (USB). For wireless communication, the interface for communication is, for example, an interface compliant with a mobile communication standard such as LTE, the 4G standard, or the 5G standard, or an interface compliant with a short-range wireless communication standard such as Bluetooth®. The communication interface 33 receives data to be used for the operations of the information processing apparatus 30, and transmits data obtained by the operations of the information processing apparatus 30 to the outside. In the present embodiment, the information processing apparatus 30 communicates with the vehicle 10 and the biological information detection apparatus 20 via the communication interface 33 and the network 40.

In the example illustrated in FIG. 4 in the present embodiment, the information processing apparatus 30 include neither an input interface nor an output interface, but may further include an input interface and an output interface. In other words, in addition to receiving (input) and transmitting (output) information via the communication interface 33, information may be input and output via the input and output interfaces included in the information processing apparatus 30.

The functions of the information processing apparatus 30 may be implemented by a processor corresponding to the controller 31 executing a program according to a method of the present embodiment. That is, the functions of the information processing apparatus 30 are realized by software. The program causes a computer to execute the operations of the information processing apparatus 30, thereby causing the computer to function as the information processing apparatus 30. That is, the computer executes the operations of the information processing apparatus 30 in accordance with the program to thereby function as the information processing apparatus 30.

(First Operation Flow of System)

Figure 5:
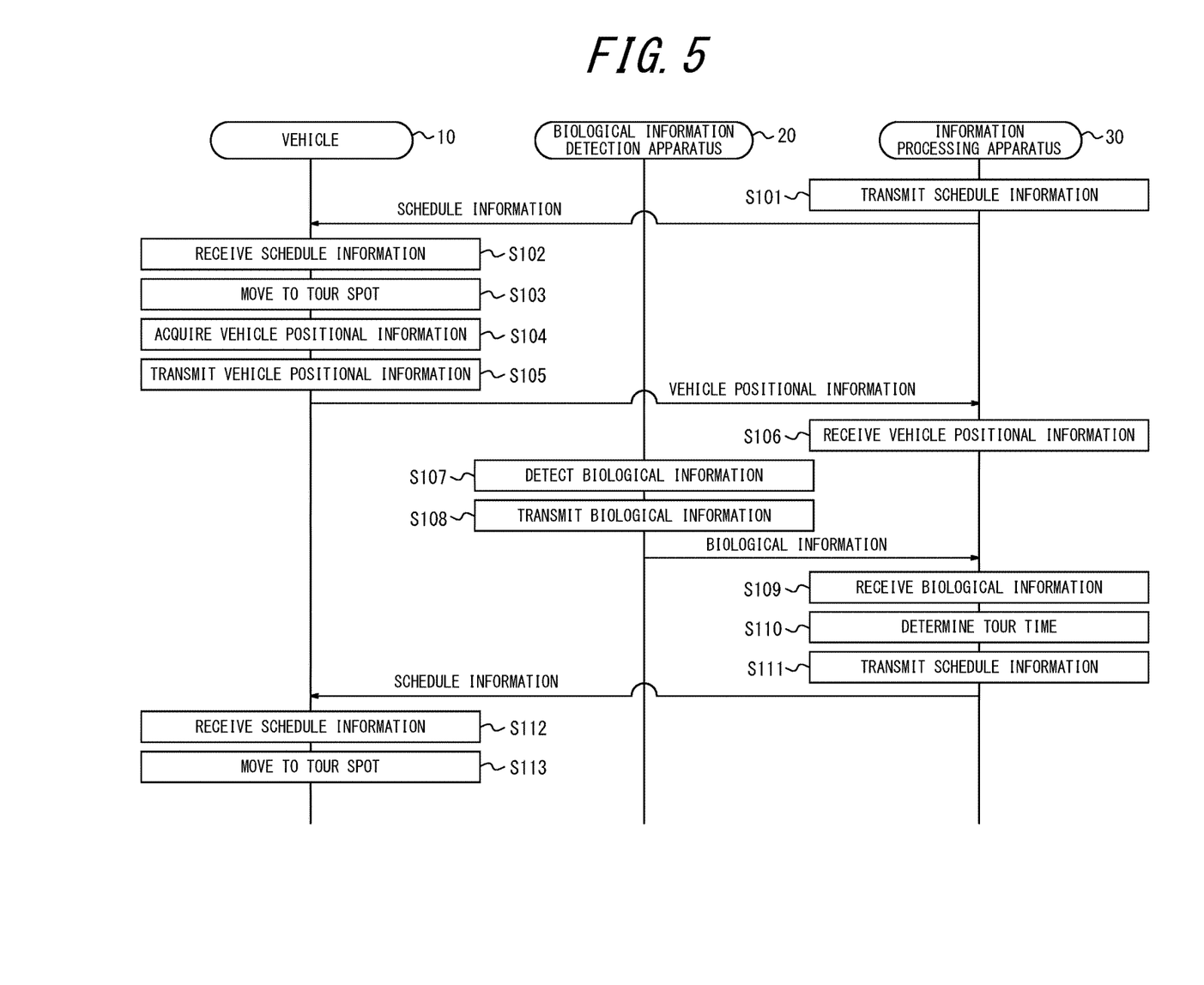
FIG. 5 is a sequence diagram illustrating first operations of the system according to the embodiment of the present disclosure.

First operations of the system 1 according to the present embodiment will be described with reference to FIG. 5. In the first operations, the information processing apparatus 30 determines a tour time at a tour spot based on biological information when a user on board the vehicle 10 is observing a process performed by equipment at the tour spot. The first operations of the system 1, which are described below, include operations (steps S101, S106, S109 to S111) of the information processing apparatus 30 according to the present embodiment.

Step S101: The communication interface 33 of the information processing apparatus 30 transmits schedule information indicating a tour schedule to the vehicle 10 under the control of the controller 31.

The tour schedule to be transmitted here includes tour spot information on one or more tour spots. The tour spot information can be information indicating the locations of the tour spots. The memory 12 of the vehicle 10 may store information identifying tour spots and information indicating the locations of the tour spots in correspondence with each other. In such a configuration, the tour spot information can be information identifying the tour spots.

Step S102: The communication interface 13 of the vehicle 10 receives the schedule information from the information processing apparatus 30.

Step S103: Under the control of the controller 11, the vehicle 10 moves to a tour spot, for example, by autonomous driving, based on the tour spot information included in the schedule information and information on a travel route (route map) in the facility stored in the memory 12.

Step S104: The positioner 14 of the vehicle 10 acquires vehicle positional information indicating the position of the vehicle 10.

Step S105: The communication interface 13 of the vehicle 10 transmits the vehicle positional information to the information processing apparatus 30 under the control of the controller 11.

Step S106: The communication interface 33 of the information processing apparatus 30 receives the vehicle positional information from the vehicle 10.

Step S107: The detection interface 21 of the biological information detection apparatus 20 detects biological information on a user who is observing a process performed by equipment at the tour spot in the facility.

Specifically, the detection interface 21 detects information indicating a heart rate, body temperature, sweating rate, voice, facial expression, and/or movement, which is the biological information.

Step S108: The communication interface 22 of the biological information detection apparatus 20 transmits the biological information to the information processing apparatus 30.

The communication interface 22 may directly transmit the biological information to the information processing apparatus 30 via the network 40. The communication interface 22 may transmit the biological information to the information processing apparatus 30 via the vehicle 10 and the network 40. Specifically, the communication interface 22 may transmit the biological information to the communication interface 13 of the vehicle 10, and the communication interface 13 may transmit the biological information to the information processing apparatus 30 under the control of the controller1 1. The output interface of the biological information detection apparatus 20 may output the biological information. The input interface 15 of the vehicle 10 may accept input of the biological information, and the communication interface 13 may transmit the biological information to the information processing apparatus 30 under the control of the controller 11.

Step S109: The communication interface 33 of the information processing apparatus 30 receives the biological information from the biological information detection apparatus 20.

Step S110: The controller 31 of the information processing apparatus determines, based on the biological information, a tour time at a tour spot in the tour schedule. Here, the tour spot at which the controller 31 determine s the tour time is the tour spot corresponding to the position of the vehicle 10 indicated by the vehicle positional information received in step S106.

Specifically, the controller 31 may estimate an evaluation for the tour spot based on the biological information, and determine that the higher the evaluation, the longer the tour time at the tour spot.

The controller 31 may, for example, estimate the user's emotion based on the biological information, and estimate the evaluation based on the emotion. The controller 31 can estimate the user's emotion based on the biological information by any method.

As an example, the biological information may be information indicating an image including an image of the user's face detected by the camera. The controller 31 may estimate the user's emotion based on the image. Specifically, the controller 31 can estimate whether the user's facial expression is smiling based on the image. When the user's facial expression is smiling, the controller 31 can estimate that the user's emotion is a "fun" emotion. When the user's facial expression is estimated to be a sleepy expression based on the image, the controller 31 can estimate that the user's emotion is a "bored" emotion. Furthermore, the biological information detection apparatus 20 can estimate the degree of the user's "fun" emotion, based on the number of times the user's facial expression is estimated to be smiling.

As another example, the biological information may be information indicating an image including an image of the user's body detected by the camera. The controller 31 may estimate the user's emotion based on the image. Specifically, when the user's behavior is estimated, using the image, to be note-taking, the controller 31 can estimate that the user's emotion is an "interesting" emotion.

The controller 31 can then determine the evaluation for the tour spot based on the degree (positivity) to which the user's emotion is positive. Note that, "positive" emotions include, for example, "fun," "interesting," "excited," and the like. The degree of positivity may be lower the higher the degree to which the user's emotion is negative. "Negative" emotions include, for example, "sleepy," "bored," "uncomfortable," and the like.

Specifically, the controller 31 can determine the higher the degree of positivity, the higher the evaluation for the tour spot. This allows the user to observe the process performed by the equipment for a longer time at the tour spot at which the user's emotion is expected to be positive, thus increasing the user's satisfaction.

When there are multiple users on board the vehicle 10, the controller 31 may determine the evaluation for the tour spot based on statistics (e.g., mean, median, or the like) of the degree of positivity of the multiple users.

Step S111: The communication interface 33 of the information processing apparatus 30 transmits, to the vehicle 10, schedule information indicating a tour schedule including the determined tour time.

Step S112: The communication interface 13 of the vehicle 10 receives the schedule information.

Step S113: When the tour time indicated by the schedule information received in step S112 has elapsed, the vehicle 10 moves to the next tour spot under the control of the controller 11.

Thereafter, the system 1 returns to step S104 and repeats the operations from step S104 to step S113.

(Second Operation Flow of System)

Figure 6:
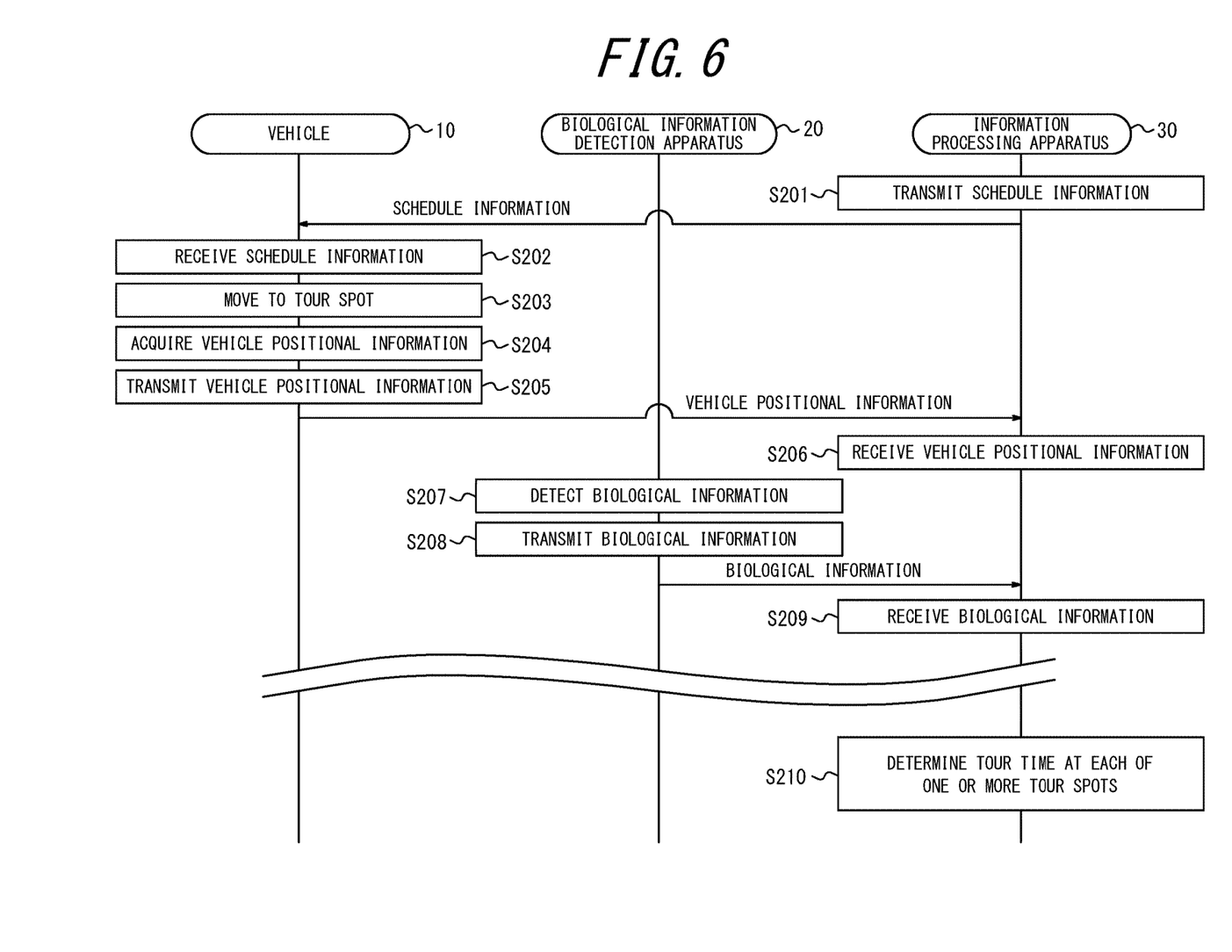
FIG. 6 is a sequence diagram illustrating second operations of the system according to the embodiment of the present disclosure.

Second operations of the system 1 according to the present embodiment will be described with reference to FIG. 6. In the second operations, the information processing apparatus 30 determines an overall tour schedule based on biological information on a user on board the vehicle as the user is observing a process performed by equipment at each of one or more tour spots, and the next or later tour is conducted according to the determined tour schedule. The second operations of the system 1, which are described below, include operations (steps S201, S206, S209, and S210) of the information processing apparatus 30 according to the present embodiment.

Step S201: The communication interface 33 of the information processing apparatus 30 transmits schedule information indicating a tour schedule to the vehicle 10 under the control of the controller 31.

The tour schedule to be transmitted here includes tour spot information on one or more tour spots.

Step S202: The communication interface 13 of the vehicle 10 receives the schedule information from the information processing apparatus 30.

Step S203: Under the control of the controller 11, the vehicle 10 moves to a tour spot, for example, by autonomous driving, based on the tour spot information included in the tour schedule indicated by the schedule information and information on a travel route (route map) in the facility stored in the memory 12.

Step S204: The positioner 14 of the vehicle 10 acquires vehicle positional information indicating the position of the vehicle 10.

Step S205: The communication interface 13 of the vehicle 10 transmits the vehicle positional information to the information processing apparatus 30 under the control of the controller 11.

Step S206: The communication interface 33 of the information processing apparatus 30 receives the vehicle positional information from the vehicle 10.

Step S207: The detection interface 21 of the biological information detection apparatus 20 detects biological information on a user who is observing a process performed by equipment at the tour spot in the facility.

Step S208: The communication interface 22 of the biological information detection apparatus 20 transmits the biological information to the information processing apparatus 30.

Step S209: The communication interface 33 of the information processing apparatus 30 receives the biological information from the biological information detection apparatus 20.

The operations from step S204 to step S209 are the same as the operations from step S104 to step S109 described above.

When the operation of step S209 is performed and the user's tour time at the tour spot has elapsed, the system 1 returns to step S203 and repeats the operations from step S203 to step S209. When a tour by the user at the one or more tour spots indicated by the schedule information is completed, the system 1 performs the operation of step S210.

Step S210: The controller 31 of the information processing apparatus determines, based on the biological information, a tour time at each tour spot in the tour schedule. Here, the controller 31 determines the tour time at each of the tour spots based on the biological information on the user at each of the tour spots corresponding to the positions of the vehicle 10 indicated by the vehicle positional information received in step S206. The controller 31 can determine the tour time at each of the tour spots, in the same manner as the operation to determine the tour time at the tour spot in the first operation flow described above.

The controller 31 can also determine a tour schedule based on equipment information regarding equipment. The equipment information includes operation information indicating an operation schedule of the equipment and operator information indicating a schedule of an operator of the equipment. The communication interface 33 receives the equipment information from a management system at least every time the equipment information is updated. The management system may be a system for managing the equipment, or a system for controlling an electric display panel that shows at a glance an operating status and abnormality of the equipment based on information from the system.

As an example, the controller 31 can determine a tour schedule based on the operation information, so that a user does not tour a tour spot with the equipment in a time period during which the equipment is not in operation. Specifically, the controller 31 determines a tour schedule so that a user does not tour a tour spot with the equipment in a time period during which the equipment is out of order or out of operation, as indicated by the operation information. This allows the user to visit tour spots with equipment that is in operation, rather than equipment that is not in operation. This helps the user better understand the equipment, thus increasing the user's satisfaction.

As another example, the controller 31 can determine a tour schedule based on the operator information. Specifically, the controller 31 can determine a tour schedule based on the operator information, so that a user tours a tour spot with the equipment of which the operator is in charge in a time period during which the operator can make an explanation. This allows the user to observe a process while listening to the explanation by the operator at the tour spot. This helps the user better understand the process performed by the equipment, thus increasing the user's satisfaction. The controller 31 can also determine a tour schedule based on the operator information, so that the user's break time does not overlap with the operator's break time. This reduces congestion in common areas into which both users and operators can enter, allowing the users to spend their break time comfortably.

The equipment information may further include process information. The process information includes information indicating a time period during which the equipment performs a series of processes. In such a configuration, the controller 31 can determine a tour schedule so that a tour time at a tour spot includes a time period during which the equipment performs a predetermined portion of the series of processes. The predetermined portion can be a portion of high importance in the processes. This allows the user to observe the portion of high importance in the processes. Thus, the user can better understand the processes, as compared to the case of observing a portion of less importance, thus increasing the user's satisfaction. The predetermined portion may be the entirety from start to end. This allows the user to observe the processes from start to end. Therefore, the user can better understand the processes, as compared to the case of observing the processes from the middle or to the middle, thus increasing the user's satisfaction.

The controller 31 may further determine a tour schedule based on a user's preferred tour spots, which are stored in advance in the memory 32. Specifically, the controller 31 can determine a tour schedule to include a user's preferred tour spots. The controller 31 may also determine a tour schedule based on the degree of a user's preference. Specifically, the controller 31 can determine a tour schedule so that a user spends longer time at a tour spot with a high degree of preference. Information indicating the user's preferred tour spots and the degree of the user's preference may be acquired in advance through a questionnaire to the user, or may be estimated based on a past visit history. This allows the user to observe processes performed by equipment at the user's preferred tour spots, thus increasing the user's satisfaction.

The information processing apparatus 30 can transmit, to the vehicle 10, the tour schedule determined as described above. Thereby, the vehicle 10 can travel according to the tour schedule determined by the information processing apparatus 30 when the next or later tour is conducted.

As described above, the information processing apparatus 30 according to the present embodiment determines a tour time at a tour spot in a tour schedule, based on biological information on a user who is observing a process performed by equipment at the tour spot in the facility.

According to such a configuration, technology regarding apparatuses that determine tour schedules is improved in that the user's satisfaction is increased because, for example, the user can observe the process for a longer time at a tour spot with a high evaluation.

While the present disclosure has been described with reference to the drawings and examples, it should be noted that various modifications and revisions may be implemented by those skilled in the art based on the present disclosure. Accordingly, such modifications and revisions are included within the scope of the present disclosure. For example, functions or the like included in each component, each step, or the like can be rearranged without logical inconsistency, and a plurality of components, steps, or the like can be combined into one or divided.

For example, an embodiment in which the configuration and operations of the information processing apparatus 30 in the above embodiment are distributed to multiple computers capable of communicating with each other can be implemented. For example, an embodiment in which some or all of the components of the information processing apparatus 30 are provided in the vehicle 10 can also be implemented.

In the embodiment described above, a sound output apparatus (e.g., speaker) provided at a tour spot in the facility can output explanatory information about equipment by sound (e.g., automated sound). The sound output apparatus may be the output interface 16 of the vehicle 10 or a speaker installed in the tour spot.

In such a configuration, the controller 31 of the information processing apparatus 30 can generate, based on the biological information, output control information controlling the volume of sound indicating the explanatory information on the equipment, which is outputted by the sound output apparatus, at the tour spot. Specifically, the controller 31 can generate output control information indicating that the sound is made louder than normal when an evaluation for the tour spot, which is estimated based on the biological information as described above, is greater than or equal to a first criterion. The controller 31 can generate output control information indicating that the sound is made lower than normal when an evaluation for the tour spot is less than or equal to a second criterion, which is less than the first criterion.

The communication interface 33 of the information processing apparatus 30 also transmits the output control information to the sound output apparatus. The sound output apparatus can control the volume of sound indicating the explanatory information based on the output control information. This allows a user to observe a process while listening to an appropriately loud sound that provides the explanatory information. For example, the user can clearly hear the explanatory information at a tour spot with a high evaluation and pay less attention to the explanatory information at a tour spot with a low evaluation.

In the embodiment described above, the memory 32 of the information processing apparatus 30 may store user identification information identifying a user and the user's preferred tour spots in correspondence with each other. For example, when a user gets on the vehicle 10, the user identification information is identified by an authentication apparatus installed in the vehicle 10, and the communication interface 13 transmits the user identification information to the information processing apparatus 30. The controller 31 of the information processing apparatus 30 may then select a tour schedule, from among a plurality of scheduled tour schedule candidates, based on the tour spots stored in the memory 32 corresponding to the user identification information on the user on board the vehicle 10. An authentication method by the authentication apparatus may be any method, for example, facial recognition.

In the embodiment described above, the system 1 does not have to have the vehicle 10. In such a configuration, the microphone and the camera, which are examples of the detection interface 21 included in the biological information detection apparatus 20, are located at each tour spot. When the biological information is information indicating voice, the controller 31 can determine a tour time at a tour spot at which the microphone that has acquired the biological information is located. When the biological information is information indicating a facial expression or movement, the controller 31 can determine a tour time at a tour spot at which the camera that has acquired the biological information is located. Then, the communication interface 33 may transmit, under the control of the controller 31, schedule information indicating a tour schedule, for example, to a mobile terminal held by a manager who guides a user. Thereby, the mobile terminal can display the schedule information, and the manager can guide the user according to the tour schedule indicated by the schedule information.

For example, an embodiment in which a general purpose computer functions as the information processing apparatus 30 according to the above embodiment can also be implemented. Specifically, a program in which processes for realizing the functions of the information processing apparatus according to the above embodiment are written may be stored in a memory of a general purpose computer, and the program may be read and executed by a processor. Accordingly, the present disclosure can also be implemented as a program executable by a processor, or a non-transitory computer readable medium storing the program.

Examples of some embodiments of the present disclosure are described below. However, it should be noted that the embodiments of the present disclosure are not limited to these examples.

[Appendix 1] An information processing apparatus configured to determine a tour schedule around a facility, the information processing apparatus comprising a controller configured to determine a tour time at a tour spot in the tour schedule, based on biological information on a user who is observing a process performed by equipment at the tour spot in the facility.

[Appendix 2] The information processing apparatus according to appendix 1, wherein the controller is configured to:
estimate an evaluation for the tour spot based on the biological information; and
determine that the higher the evaluation, the longer the tour time at the tour spot.

[Appendix 3] The information processing apparatus according to appendix 1 or 2, wherein the biological information includes information indicating a heart rate, body temperature, sweating rate, brain wave, voice, facial expression, and/or movement.

[Appendix 4] The information processing apparatus according to any one of appendices 1 to 3, wherein the controller is configured to generate, based on the biological information, output control information controlling a volume of sound of a sound output apparatus outputting, at the tour spot, explanatory information about the process by sound.

[Appendix 5] The information processing apparatus according to any one of appendices 1 to 4, wherein the controller is configured to determine the tour schedule based on operation information indicating an operation schedule of the equipment, so that the user does not tour the tour spot with the equipment in a time period during which the equipment is not in operation.

[Appendix 6] The information processing apparatus according to any one of appendices 1 to 5, wherein the controller is configured to determine the tour schedule based on operator information indicating a schedule of an operator of the equipment, so that the user tours the tour spot with the equipment of which the operator is in charge in a time period during which the operator can make an explanation.

[Appendix 7] The information processing apparatus according to any one of appendices 1 to 6, wherein the controller is configured to determine the tour schedule based on process information indicating a time period during which the equipment performs a series of processes, so that the tour time at the tour spot includes a time period during which the equipment performs a predetermined portion of the series of processes.

[Appendix 8] A method performed by an information processing apparatus configured to determine a tour schedule around a facility, the method comprising determining a tour time at a tour spot in the tour schedule, based on biological information on a user who is observing a process performed by equipment at the tour spot in the facility.

[Appendix 9] The method according to appendix 8, wherein the determining of the tour time includes:
estimating an evaluation for the tour spot based on the biological information; and
determining that the higher the evaluation, the longer the tour time at the tour spot.

[Appendix 10] The method according to appendix 8 or 9, wherein the biological information includes information indicating a heart rate, body temperature, sweating rate, brain wave, voice, facial expression, and/or movement.

[Appendix 11] The method according to any one of appendices 8 to 10, wherein the determining of the tour time includes generating, based on the biological information, output control information controlling a volume of sound of a sound output apparatus outputting, at the tour spot, explanatory information about the process by sound.

[Appendix 12] The method according to any one of appendices 8 to 11, wherein the determining of the tour time includes determining the tour schedule based on operation information indicating an operation schedule of the equipment, so that the user does not tour the tour spot with the equipment in a time period during which the equipment is not in operation.

[Appendix 13] The method according to any one of appendices 8 to 12, wherein the determining of the tour time includes determining the tour schedule based on operator information indicating a schedule of an operator of the equipment, so that the user tours the tour spot with the equipment of which the operator is in charge in a time period during which the operator can make an explanation.

[Appendix 14] The method according to any one of appendices 8 to 13, wherein the determining of the tour time includes determining the tour schedule based on process information indicating a time period during which the equipment performs a series of processes, so that the tour time at the tour spot includes a time period during which the equipment performs a predetermined portion of the series of processes.

[Appendix 15] A non-transitory computer readable medium storing a program configured to cause an information processing apparatus to execute operations, the information processing apparatus being configured to determine a tour schedule around a facility, the operations comprising determining a tour time at a tour spot in the tour schedule, based on biological information on a user who is observing a process performed by equipment at the tour spot in the facility.

[Appendix 16] The non-transitory computer readable medium according to appendix 15, wherein the operations comprise:
estimating an evaluation for the tour spot based on the biological information; and
determining that the higher the evaluation, the longer the tour time at the tour spot.

[Appendix 17] The non-transitory computer readable medium according to appendix 15 or 16, wherein the biological information includes information indicating a heart rate, body temperature, sweating rate, brain wave, voice, facial expression, and/or movement.

[Appendix 18] The non-transitory computer readable medium according to any one of appendices 15 to 17, wherein the operations comprise generating, based on the biological information, output control information controlling a volume of sound of a sound output apparatus outputting, at the tour spot, explanatory information about the process by sound.

[Appendix 19] The non-transitory computer readable medium according to any one of appendices 15 to 18, wherein the operations comprise determining the tour schedule based on operation information indicating an operation schedule of the equipment, so that the user does not tour the tour spot with the equipment in a time period during which the equipment is not in operation.

[Appendix 20] The non-transitory computer readable medium according to any one of appendices 15 to 19, wherein the determining of the tour time includes determining the tour schedule based on operator information indicating a schedule of an operator of the equipment, so that the user tours the tour spot with the equipment of which the operator is in charge in a time period during which the operator can make an explanation.

The invention claimed is:

1. A system comprising:
a vehicle; and
an information processing apparatus configured to determine a tour schedule around a facility, the information processing apparatus comprising a controller configured to determine a tour time at a tour spot in the tour schedule, based on biological information on a user who is observing a process performed by equipment at the tour spot in the facility, and transmit schedule information indicating the tour schedule for autonomous driving to the vehicle traveling in the facility with the user,
wherein the controller is configured to:
estimate an evaluation for the tour spot based on the biological information; and
determine that the higher the evaluation, the longer the tour time at the tour spot, and
wherein the vehicle is configured to drive autonomously based on the schedule information received from the information processing apparatus, and travel such that the higher the evaluation, the longer the tour time at the tour spot.

2. The information processing apparatus according to claim 1, wherein the biological information includes information indicating a heart rate, body temperature, sweating rate, brain wave, voice, facial expression, and/or movement.

3. The information processing apparatus according to claim 1, wherein the controller is configured to generate, based on the biological information, output control information controlling a volume of sound of a sound output apparatus outputting, at the tour spot, explanatory information about the process by sound.

4. The information processing apparatus according to claim 1, wherein the controller is configured to determine the tour schedule based on operation information indicating an operation schedule of the equipment, so that the user does not tour the tour spot with the equipment in a time period during which the equipment is not in operation.

5. The information processing apparatus according to claim 1, wherein the controller is configured to determine the tour schedule based on operator information indicating a schedule of an operator of the equipment, so that the user tours the tour spot with the equipment of which the operator is in charge in a time period during which the operator can make an explanation.

6. The information processing apparatus according to claim 1, wherein the controller is configured to determine the tour schedule based on process information indicating a time period during which the equipment performs a series of processes, so that the tour time at the tour spot includes a time period during which the equipment performs a predetermined portion of the series of processes.

7. A method performed by a vehicle and an information processing apparatus configured to determine a tour schedule around a facility, the method comprising:
determining a tour time at a tour spot in the tour schedule, based on biological information on a user who is observing a process performed by equipment at the tour spot in the facility;
transmitting schedule information indicating the tour schedule for autonomous driving to the vehicle traveling in the facility with the user;
estimating an evaluation for the tour spot based on the biological information;
determining that the higher the evaluation, the longer the tour time at the tour spot, and
controlling the vehicle to drive autonomously based on the schedule information received from the information processing apparatus, and controlling travel of the vehicle such that the higher the evaluation, the longer the tour time at the tour spot.

8. The method according to claim 7, wherein the biological information includes information indicating a heart rate, body temperature, sweating rate, brain wave, voice, facial expression, and/or movement.

9. The method according to claim 7, wherein the determining of the tour time includes generating, based on the biological information, output control information controlling a volume of sound of a sound output apparatus outputting, at the tour spot, explanatory information about the process by sound.

10. The method according to claim 7, wherein the determining of the tour time includes determining the tour schedule based on operation information indicating an operation schedule of the equipment, so that the user does not tour the tour spot with the equipment in a time period during which the equipment is not in operation.

11. The method according to claim 7, wherein the determining of the tour time includes determining the tour schedule based on operator information indicating a schedule of an operator of the equipment, so that the user tours the tour spot with the equipment of which the operator is in charge in a time period during which the operator can make an explanation.

12. The method according to claim 7, wherein the determining of the tour time includes determining the tour schedule based on process information indicating a time period during which the equipment performs a series of processes, so that the tour time at the tour spot includes a time period during which the equipment performs a predetermined portion of the series of processes.

* * * * *